Sept. 15, 1925.
A. D. TRENOR
1,553,650
SYSTEM OF CONTROL FOR MOVING BODIES
Original Filed July 5, 1919   3 Sheets-Sheet 1
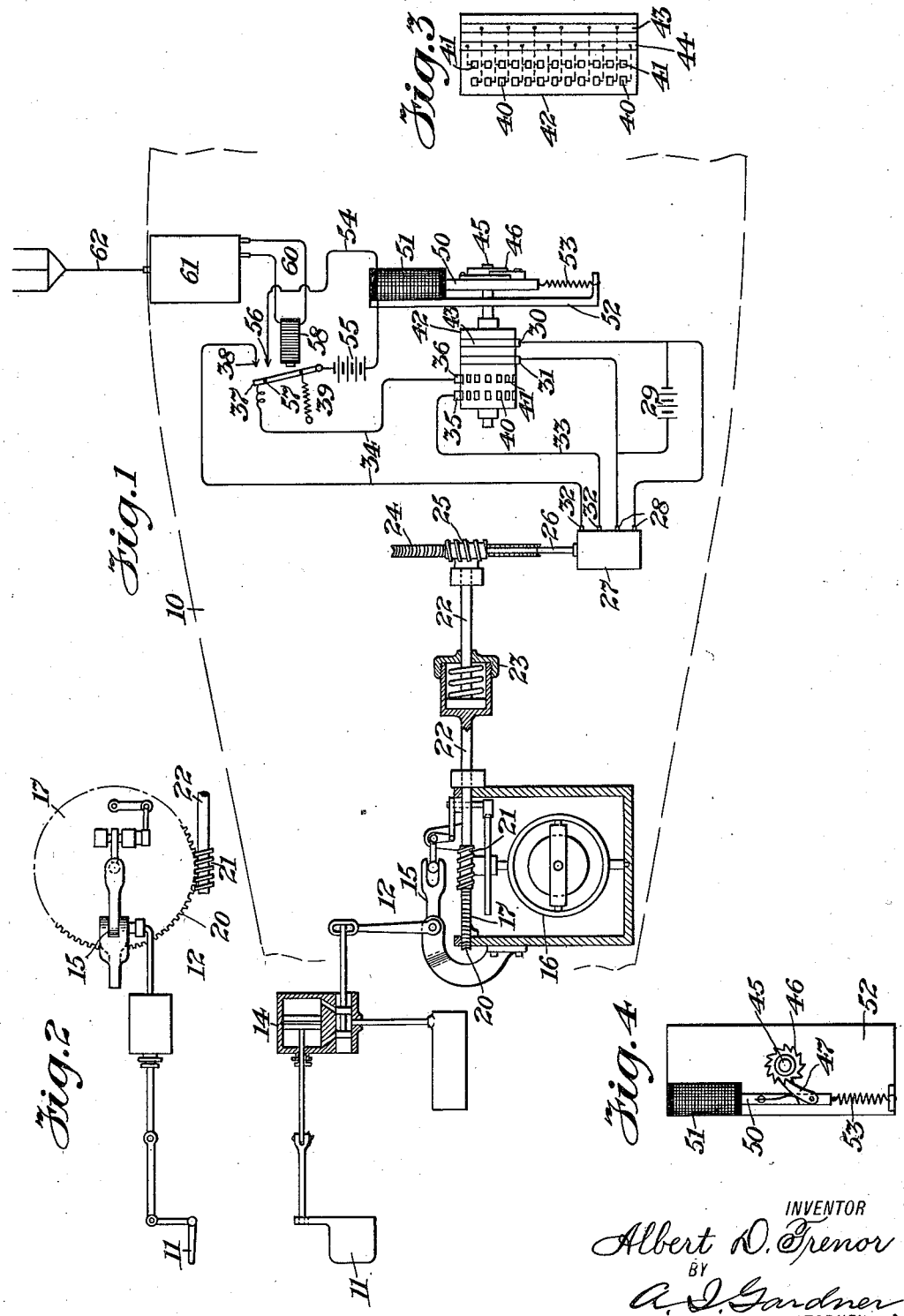
INVENTOR
Albert D. Trenor
BY
A. I. Gardner
HIS ATTORNEY

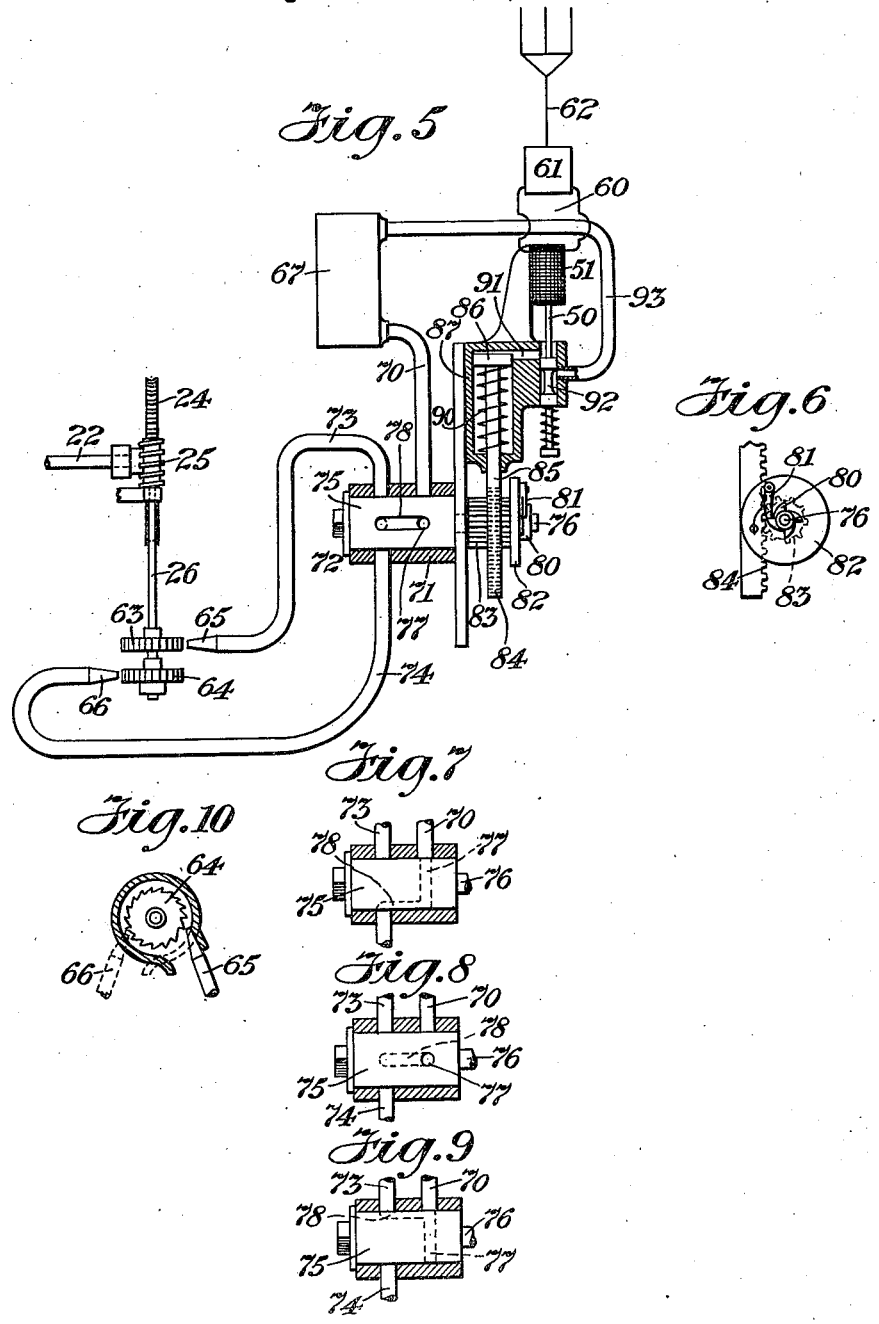

Sept. 15, 1925.
A. D. TRENOR
SYSTEM OF CONTROL FOR MOVING BODIES
Original Filed July 5, 1919     3 Sheets—Sheet 3
1,553,650
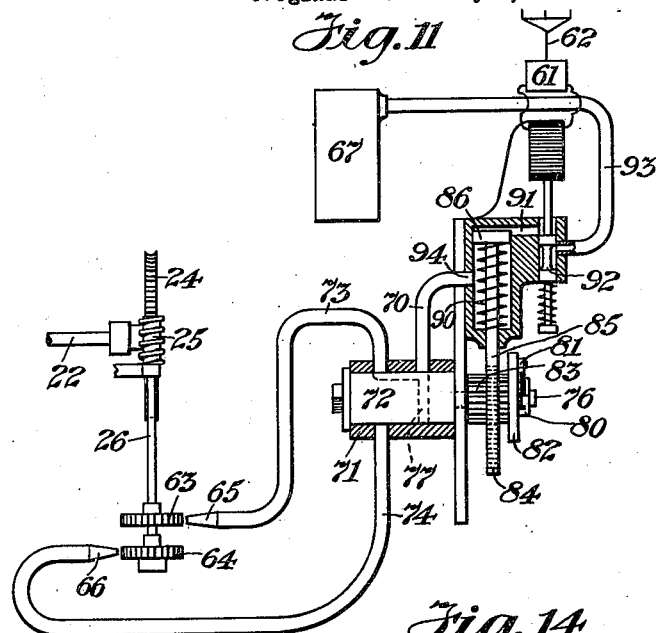
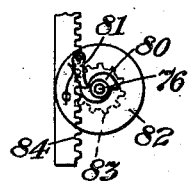
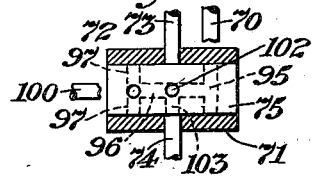
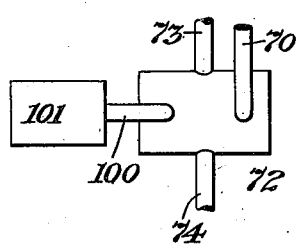
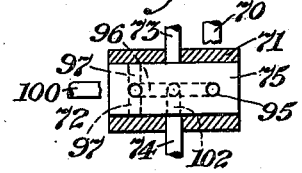
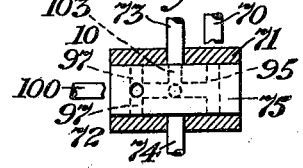
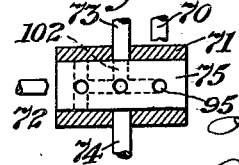
INVENTOR
Albert D. Trenor
BY
A. J. Gardner
HIS ATTORNEY Patented Sept. 15, 1925.

1,553,650

UNITED STATES PATENT OFFICE.

ALBERT D. TRENOR, OF NEW YORK, N. Y., ASSIGNOR TO JOHN HAYS HAMMOND, JR., OF GLOUCESTER, MASSACHUSETTS.

SYSTEM OF CONTROL FOR MOVING BODIES.

Application filed July 5, 1919, Serial No. 308,747. Renewed December 3, 1924.

*To all whom it may concern:*

Be it known that I, ALBERT D. TRENOR, a citizen of the United States, and a resident of New York, county of New York, and State of New York, have invented certain new and useful Improvements in Systems of Control for Moving Bodies, of which the following is a specification.

Some of the objects of the present invention are to provide a distant control for moving bodies; to provide means operated by radiant energy for controlling at will the direction of a moving distant body; to provide means operated from a distance for returning a moving body to its course; to provide means including an electrical power transmitting device for controlling the direction of a moving body; to provide means including a fluid actuated mechanism for controlling the direction of a moving body; and to provide other improvements as will hereinafter appear.

In the accompanying drawings Fig. 1 represents diagrammatically a control system embodying the present invention as applied to a marine body such as a torpedo or other suitable body; Fig. 2 represents a plan of one form of the rudder operating mechanism; Fig. 3 represents a detail showing the surface development of a form of commutator employed; Fig. 4 represents a detail in end elevation of one means for causing a step by step movement of the commutator; Fig. 5 represents diagrammatically another form of the distant controlled mechanism for actuating the rudder operating mechanism; Fig. 6 represents an end elevation of one means for causing a step by step movement of the control valve embodied in the construction of Fig. 5; Figs. 7, 8 and 9 represent respectively the control valve of Fig. 5 in different operative positions; Fig. 10 represents a fragmentary plan of the pressure fluid nozzles in operative position; Fig. 11 represents a modified form of the mechanism shown in Fig. 5; Fig. 12 represents an end elevation of one means for causing a step by step movement of the control valve shown in Fig. 11; Fig. 13 represents a side elevation of another form of control valve; and Figs. 14, 15, 16 and 17 represent respectively the control valve of Fig. 13 in different operative positions.

Referring to the drawings, and more particularly to Fig. 1, one form of the present invention is shown for controlling the direction of movement of a dirigible body about an axis, which in the present instance may be taken as a vertical axis, while the body itself may be assumed to be a torpedo.

For varying the direction of movement of the body 10 about a vertical axis, a rudder 11 is employed which is arranged to be controlled automatically and at will from a distance through the medium of a rudder operating mechanism 12. This mechanism 12 is fully described in co-pending application Serial Number 262,714, and as the present invention relates more particularly to the distant controlled mechanism it is believed unnecessary to here do more than outline the general structure of the rudder operating mechanism 12. Thus the rudder 11 may be turned as desired by the operation of a prime mover 14 arranged to be actuated by the movement of a lever system 15 having a dual control, one part of which is subject to the action of a stabilizing device 16 and the other part of which is subject to the action of a distant controlled mechanism. This latter portion includes a rotary disc 17 as an element, the movement of which under the action of the distant control mechanism causes the lever system 15 to operate the prime mover 14 in the manner necessary to cause the rudder 11 to move in the desired direction. The disc 17 is arranged to be turned by providing a worm rack 20 on its peripheral edge and engaged by a worm gear 21 rigidly secured to a split shaft 22 having a friction clutch 23 interposed in its length in order that the parts may slip under abnormal conditions and thus prevent damage to the mechanism.

For the purpose of rotating the shaft 22 in either direction about its axis, a worm wheel 24 is fixed thereto and meshes with a worm gear 25 on a shaft 26 driven by a motor 27 having its field terminals 28 in a circuit including a battery 29 and two brush terminals 30 and 31. The armature terminals 32 are connected respectively by leads 33 and 34 to two brushes 35 and 36, the lead 33 passing direct to the brush 35 while the lead 34 is normally broken to include a relay armature switch 37 and contact terminal 38 before being connected to the brush 36. A spring 39 is provided to normally hold the armature 37 in the open position and maintain the circuits broken. The brushes 35 and 36 are arranged respectively to bear against and provide surface contact simultaneously with contacts of two series of contacts 40 and 41 on a commutator 42, which also carries a pair of slip rings 43 and 44 arranged respectively for continuous contact with the brush terminals 30 and 31. The two series of contacts 40 and 41 are similarly arranged about the periphery of the commutator 42, namely in spaced relation and in the same circumferential planes respectively but in axial alinement so that the brushes 35 and 36 simultaneously pass over the insulated surface of the commutator 42 and then over contacts 40 and 41.

Peripherally considered the contacts of the respective series 40 and 41 are alternately electrically bonded to the two slip rings 43 and 44, the arrangement being such that a contact of one series is connected to one slip ring while the opposite contact, axially considered, of the other series is connected to the opposite slip ring. Thus when the brush terminals 35 and 36 rest on one pair of contacts the motor 27 will be driven in one direction and when resting on the next adjacent pair of contacts the motor 27 will be driven in the reverse direction and consequently provision is made for turning the controlled body in either direction about a vertical axis. The operation of the motor 27 is determined by the closing of the relay controlled switch 37.

In the present form, shown by way of example, there are twelve contacts to each of the series 40 and 41, and consequently the commutator may have twelve operative positions, in each of which the operation of the motor depends upon whether or not the relay controlled switch 37 is closed.

In order that a step by step movement may be imparted to the commutator 42, the shaft 45 thereof is extended laterally and has a ratchet 46 rigidly mounted upon it to be engaged by a spring pressed pawl 47 which is pivotally mounted upon a core 50 of a solenoid 51. A suitable fixed frame 52 supports the solenoid 51 in operative relation and serves also to retain one end of a spring 53 which is attached to the core 50 to retract the core 50 when the solenoid 51 is de-energized. The solenoid 51 is in a circuit 54 including a battery 55 and a terminal contact 56, this latter being positioned in the path of the relay armature 37 and when engaged by said armature 37 the circuit 54 is closed and the solenoid 51 is energized. In order to prevent confusion between the circuit 54 and the circuit controlled by contact terminal 38, the armature 37 is provided with an insulated portion 57 subdividing the armature 37 into two electrically distinct parts, one of which is in the circuit 54 and the other of which is connected to lead 34 from the brush 36.

For operating the armature 37 to simultaneously close both the circuits controlled by it, a relay magnet 58 is provided in a circuit 60 controlled by a suitable form of receiving apparatus 61 arranged to be actuated by an open aerial circuit 62 in a well known manner.

In operating this form of the invention an impulse of radiant energy is sent from the distant station and causes the receiving apparatus 61 to close the circuit 60 and thereby energize the relay magnet 58. The armature 37 is thus drawn into contact with the terminals 38 and 56 to simultaneously close the break in the circuit of motor 27 and the circuit 54, so that the solenoid 51 is energized and operates its core 50. The movement of the core 50 is transmitted by the pawl 47 to the ratchet 46 which causes the commutator 42 to turn one twelfth of a revolution, thereby bringing a pair of the surface contacts into electrical engagement with the brushes 35 and 36. As the circuit of the motor 27 is closed by the armature switch 37 the motor 27 starts, thereby rotating the worm 43 and transmitting motion to the rotary disc 17 which actuates the rudder operating mechanism 12 to cause the prime mover 14 to shift the rudder 11 in the desired direction. This movement of the disc 17 continues as long as the received impulse is sent out and the moving body 10 continues to turn until it is brought to the proper angular position to give the new course desired. Should the commutator 42 be in such a position as to cause the rudder 11 to be shifted in the wrong direction for the desired body direction, it may be correctly set by first sending a short impulse and then follow by a long operating impulse. When the impulse stops the solenoid 58 is deenergized and the spring 39 opens the armature switch 37 thus stopping the motor 27 and returning the core 50 to its initial position. The rotation of the disc 17 therefore stops and the moving body 10 then proceeds on a straight course under the action of the stabilizing means 16.

In Fig. 5 another form of the invention is shown wherein the shaft 22 is arranged to be operated by pressure fluid means and to that end the driven shaft 26 has rigidly secured thereto two turbine wheels 63 and 64 located respectively in operative relation to two nozzles 65 and 66. The blades of the respective turbine wheels 63 and 64 are so disposed that pressure fluid discharged from the nozzle 65 will cause the shaft 26 to rotate in a counter-clockwise direction while pressure fluid from the nozzle 66 will cause the shaft 26 to rotate in a clockwise direction.

For supplying and controlling pressure fluid to the nozzles 65 and 66 a tank 67 or other suitable source of fluid under pressure is provided having an outlet pipe 70 which is connected to and opens through a stationary casing 71 of a rotary valve structure 72. From the casing 71 two conduits 73 and 74 lead to the nozzle structure, one pipe 73 being connected to the nozzle 65 and the other 74 being connected to the nozzle 66. Within the casing 71 is a movable element 75 arranged to be rotated by motion transmitted to a laterally disposed axial stem 76 in order to establish communication between one or the other of the pipes 73 and 74 with the source of pressure fluid 67. To accomplish this the movable element 75 is provided with a transverse port 77, the ends of which are in circumferential alinement with the discharge end of the pipe 70, so that when the rotary member 72 is turned to bring the port 77 into its alined position, pressure fluid is admitted to a distributor passage 78 formed as an elongated recess extending longitudinally of the member 75 to intersect the inlet to the pipe 73 or pipe 74 according to the position of the rotary member 72.

For rotating the stem 76 a ratchet 80, preferably of the four tooth type is keyed to the stem 76 in position to be engaged by a spring pressed pawl 81 pivoted to the face of a disc 82 which is fast to a gear 83 mounted for free rotary movement upon the stem 76. This gear 83 is in mesh with a rack bar 84 formed as an extension of a piston rod 85 carrying a piston 86 which is mounted for free sliding movement in a cylinder 87 and is normally held in one position by a coil spring 90. Pressure fluid is arranged to shift the piston 86 against the spring 90 by providing an inlet port 91 to the cylinder 87 back of the piston and providing also a valve 92 for opening and closing the port 91 as required. The valve 92 is preferably of the slide type and is here arranged to be moved to open the port 91 by means of the solenoid 51, the core 50 of which is directly connected to the movable valve body 92. A pipe 93 leads from the tank 67 and opens transverse to the path of the valve 92, being normally cut off from the port 91.

In the operation of this form of the invention a transmitted impulse of radiant energy is received by the receiving apparatus 61, thereby operating to close the circuit 60 including the solenoid 51 which is then energized to shift the valve stem 92. This action admits pressure fluid from the pipe 93 to the inlet port 91 and causes the piston 86 to be forced in a direction to turn the ratchet 80 through a quarter of a revolution and hence the rotary member 75 in the same manner, thereby bringing the parts to the position indicated in Fig. 7. Therefore communication is established between the pipe 70 and the conduit 74 so that pressure fluid is discharged against the turbine wheel 64 to turn the shaft 26 in a clockwise direction and thereby actuate the rudder operating mechanism 12 as previously described. When it is desired to stop this turning movement of the body 10 another impulse is sent, whereby the rotary valve member 72 is given another quarter turn and the port 77 is turned out of register with the fluid supply pipe 70 and the body 10 then continues on a straight course under the action of the stabilizing device 16. If another impulse now be received the rotary valve member 72 will assume another position, but this time establishing a connection between the pipe 70 and the pipe 73 which operates the turbine wheel 63 to cause the shaft 26 to be turned in a counter-clockwise direction. This last position of the valve 72 is shown in Fig. 9, while the inoperative position of the same valve 72 is shown in Fig. 8.

In the form of the invention shown in Fig. 11, the general arrangement and operation are the same as described in connection with Fig. 5, though here the supply of pressure fluid is under the direct control of the slide valve 92, the arrangement being such that when the valve 92 opens the port 91, as heretofore described, the entering fluid first operates the piston 86 and thereafter enters a port 94 which is in communication with the pipe 70. In this form the ratchet 80 is of the two toothed type and each impulse turns the member 75 through one half a revolution, so that there are only two positions of the valve instead of four and the steering is done by making a long impulse at the proper time. If the rotary valve 75 is in such a position that an operating impulse will set it incorrectly for the desired direction of the moving body, it may be correctly positioned by first sending a short impulse and then following it with a long impulse which carries out the complete function.

As a means for bringing the rudder operating mechanism to rest promptly after a directing movement, in order to prevent the moving body over-running its course, a modified form of control valve 72 may be employed and so arranged with its adjuncts as to the shaft 26 to be subjected to a reverse action temporarily. In this form of the device the rotary member 75 is provided with a transverse diametrical port 95 arranged to be brought into register with the fluid supply pipe 70, and has also an axially disposed bore 96 leading from the port 95 and terminating in four radially disposed passages 97, equally spaced with respect to the circumference of the member 75, any one of which may be brought into register with a conduit 100. A receiver 101 for fluid under pressure is in communication with the conduit 100. Intermediate the length of the bore 96 there are two radially arranged ports 102 and 103, so located that upon rotating the member 75 they register alternately with the pipes 73 and 74.

In the operation of this form of valve the turbine supply pipes 73 and 74 are normally cut off because the valve 72 is in neutral position as shown in Fig. 14. When an impulse is received the member 75 is turned through a quarter of a revolution and the parts assume the positions indicated in Fig. 15, so that pressure fluid passes from the pipe 70 by way of port 95, bore 96 and port 102 to the pipe 74 and thence to the nozzle 66, resulting in rotating the shaft 26 in a clockwise direction to cause the moving body 10 to turn to the right as previously described. At the same time the pressure fluid passes to the end of the bore 96, then traverses the passage 97, which is in register, and enters the receiver 101 by way of the pipe 100. When it is desired to stop the turning of the body 10, another impulse is sent which moves the rotary member 75 to the position shown in Fig. 16, ninety degrees with respect to its last position. This cuts off the supply of pressure fluid from the turbine wheel 64 and it begins to die down. At the same time, however, the compressed fluid in the receiver 101 is free to escape by way of a registered passage 97, bore 96, port 103 and pipe 73 to the nozzle 65 where it acts on the turbine wheel 63 to stop the motion imparted to the shaft 26 by the turbine wheel 64. By properly proportioning the receiver 101 the shaft 26 may be stopped very quickly after the impulse has been received. If another impulse is sent the parts are turned to the position shown in Fig. 17 and the same operation takes place though in such a manner as to actuate the turbine 63 to give a counter-clockwise direction to the shaft 26 and consequently turn the moving body 10 to the left.

As a modification of the construction shown in Fig. 1, the commutator 42 may be arranged with six pairs of spaced contacts, instead of twelve, and the conductor 34 is then connected direct to the brush 36 so that the motor 27 is started or stopped according as the brushes 35 and 36 are resting on a pair of contacts 40 and 41 or upon the insulated surface of the commutator 42. In this form the relay switch 37 is arranged to open and close but one circuit, namely, the solenoid circuit 54. The normal position of the brushes 35 and 36 is upon the insulated surface of the commutator 42 so that the motor 27 is at rest. When a signal is received the relay 58 operates to close the solenoid circuit 54 and thereby turn the commutator 42 one twelfth of a revolution and cause the brushes 35 and 36 to engage a pair of the contacts 40 and 41 to give the desired movement to the rudder 11.

Although several of the many forms in which this invention may be embodied have been shown herein, it is to be understood that the invention is not limited to any specific construction but might be applied to various forms without departing from the spirit of the invention or the scope of the appended claims.

Having now described my invention, what I desire to secure and protect by Letters Patent is set forth in the following claims:—

1. The combination with a movable body, of an element carried thereby and rotatable relatively thereto in either direction about a predetermined axis, a second element rotatable about said axis in either direction and arranged to co-operate with said first mentioned element, stabilizing means arranged to hold said first mentioned element against rotation in space about said axis, a motor arranged to rotate said second mentioned element in either of said directions about said axis, and means responsive to electrical impulses for causing said motor to be rotated selectively in one direction or in the opposite direction, said means comprising a rotatable energy distributing device rotatable about a given axis step by step in one direction only through a plurality of steps and effective at one step to cause said motor to be rotated in one direction, said distributing device being effective to cause said motor to be rotated, and being effective to cause said motor to be rotated in one direction at one step and in the opposite direction at the next step throughout the rotation of said device.

2. The combination with a movable body, of an element carried thereby and rotatable relatively thereto in either direction about an axis fixed with respect to said body, a second element rotatable about said axis in either direction and arranged to co-operate with said first mentioned element, stabilizing means arranged to hold said first mentioned element against rotation in space about said axis, a motor arranged to rotate said second mentioned element in either of said directions about said axis, and means responsive to electrical impulses for causing said motor to be rotated selectively in one direction or in the opposite direction, said means comprising a rotatable energy distributing device rotatable about a given axis step by step in one direction only through a plurality of steps and effective at one step to cause said motor to be rotated in one direction, said distributing device being effective to cause said motor to be rotated, and being effective to cause said motor to be rotated in one direction at one step and in the opposite direction at the next step throughout the rotation of said device.

3. The combination with a movable body, of an element carried thereby and rotatable relatively thereto in either direction about a predetermined axis, a second element rotatable about said axis in either direction and arranged to co-operate with said first mentioned element, stabilizing means arranged to hold said first mentioned element against rotation in space about said axis, a motor arranged to rotate said second mentioned element, in either of said directions about said axis, and means responsive to electrical impulses for causing said motor to be rotated selectively in one direction or in an opposite direction, said means comprising an electrical commutator rotatable step by step about a given axis in response to successive impulses of electrical energy and provided with two slip rings and two series of spaced contacts, a pair of brushes engaging said slip rings respectively, a source of energy having two terminals connected to said brushes respectively, a second pair of brushed arranged to co-operate with said two series of contacts, said second pair of brushes being operatively connected to said motor to supply energy thereto.

4. The combination with a movable body, of an element carried thereby and rotatable relatively thereto in either direction about a predetermined axis, a second element rotatable about said axis in either direction and arranged to co-operate with said first mentioned element, stabilizing means arranged to hold said first mentioned element against rotation in space about said axis, a motor arranged to rotate said second mentioned element, in either of said directions about said axis, and means responsive to electrical impulses for causing said motor to be rotated selectively in one direction or in the opposite direction, said means comprising an electrical commutator rotatable step by step about a given axis in response to successive impulses of electrical energy and provided with two slip rings and two series of spaced contacts, a pair of brushes engaging said slip rings respectively, a source of energy having two terminals connected to said brushes respectively, a second pair of brushes arranged to co-operate with said two series of contacts, said second pair of brushes being operatively connected to said motor only, and a normally opened switch which is arranged to be closed each time that an impulse of energy is received sufficient to rotate said commutator through a single step.

5. The combination with a movable body, of an element carried thereby and rotatable relatively thereto in either direction about a predetermined axis, a second element rotatable about said axis in either direction and arranged to co-operate with said first mentioned element, stabilizing means arranged to hold said first mentioned element against rotation in space about said axis, a motor arranged to rotate said second mentioned element in either of said directions about said axis, and means responsive to electrical impulses for causing said motor to be rotated selectively in one direction or in the opposite direction, said means comprising an electrical commutator rotatable step by step in one direction only through a plurality of steps, an electromagnet arranged to rotate said commutator through said steps, a normally opened circuit including a source of energy and a vibratory armature for energizing said magnet, an electromagnet arranged to act upon said armature, to close said circuit, a switch carried by said armature but insulated therefrom, and a normally opened circuit operatively connected to said motor through said commutator and said switch for supplying energy to said motor.

6. The combination with a movable body, of an element carried thereby and rotatable relatively thereto in either direction about a predetermined axis, a second element rotatable about said axis in either direction and arranged to co-operate with said first mentioned element, stabilizing means arranged to hold said first mentioned element against rotation in space about said axis, a motor arranged to rotate said second mentioned element in either of said directions about said axis, and means responsive to said electrical impulse for causing said motor to be rotated to cause said second mentioned element to be rotated about said axis through an angle dependent in extent upon the duration of an electrical impulse, said means comprising a rotatable energy distributing device rotatable about a given axis step by step in one direction only through a plurality of steps and effective at one step to cause said motor to be rotated in one direction, said distributing device being effective to cause said motor to be rotated, and being effective to cause said motor to be rotated in one direction at one step and in the opposite direction at the next step throughout the rotation of said device.

Signed at New York in the county of and State of New York this 2nd day of July A. D. 1919.

ALBERT D. TRENOR.